May 22, 1956  W. R. KING  2,746,083
FEEDING MECHANISM
Filed Jan. 29, 1953

INVENTOR.
W. R. KING.
BY Hudson and Young
ATTORNEYS

United States Patent Office 2,746,083
Patented May 22, 1956

2,746,083

FEEDING MECHANISM

William R. King, Bartlesville, Okla., assignor to Phillips Petroleum Company, a corporation of Delaware Application January 29, 1953, Serial No. 334,021

13 Claims. (Cl. 18—1)

This invention relates to mechanism for feeding granular material. In another aspect, it relates to a process for pelleting carbon black.

Carbon black is produced in the furnace process by the incomplete combustion of carbonaceous material, such as a heavy gas oil, the carbon black being separated from the combustion gases after the reaction is completed. As it comes from the separation device, the carbon black is in a fluffy flocculent condition, and has a bulk density of approximately four pounds per cubic foot. In this condition, the black is extremely difficult to handle or package, and the bulk of the package required for holding a given weight of black is too great to permit economical shipment. Accordingly, before shipping or handling, the carbon black is subject to a treatment whereby its density is increased.

A commercially successful and extremely satisfactory treatment of this type is the formation of the flocculent carbon black into relatively hard dense pellets. Such pellets may have a bulk density of as high as twenty-five to thirty pounds per cubic foot, as compared to approximately four pounds per cubic foot for the flocculent black. Therefore, in the form of pellets, the bulk of a package required for holding a given weight of black is substantially decreased. Further, due to the aggregation of the flocculent particles, there is little dust formation when the carbon black pellets are handled. Dust formation is a serious and annoying problem when an attempt is made to handle or package the carbon black in its flocculent condition.

One very satisfactory method of forming pellets of carbon black is to introduce the material into a rotating cylindrical mill wherein there is a gentle "cascading" or rolling and tumbling action as the carbon black particles elevated by rotation of the mill roll and tumble transversely across the sloping surface of the bed in the mill. The resulting carbon black pellets are removed from the outlet end of the mill for packaging or shipment in tank cars. In most cases it is advantageous, and in some cases it is essential that a portion of the product pellets be recycled to the inlet end of the mill. Although the exact mechanism of the action of the recycled pellets is not known, it is believed that they are broken up in the mill into smaller sizes and serve as nuclei for the formation of larger pellets from the flocculent black charge to the mill.

In many cases, it has been found desirable to introduce the flocculent black to the mill at a plurality of points spaced longitudinally within the pellet mill. This has been done by the use of a plurality of screw conveyors each extending a different distance into the pellet mill. A disadvantage of this type of structure is that the opening at the inlet end of the mill must, in this case, be sufficiently large as to accommodate the plurality of screw conveyors. This creates a rather difficult sealing problem at the inlet end of the mill and prevents the bed depth in the mill from exceeding the radial distance from the outer circumference of the mill to the outer edge of the opening. In other cases, it has been proposed to utilize a single screw conveyor, a plurality of longitudinally spaced openings being provided in the tube surrounding the conveyor, each opening being in the bottom part of the tube. Difficulties have been experienced with this type of conveyor mechanism resulting from clogging of the openings by masses of flocculent carbon black.

In the copending application of H. A. Larson and W. R. King, Serial No. 268,644, filed January 28, 1952 and entitled "Feeding Mechanism," a feeding mechanism is shown wherein the flocculent black is fed into the mill through a central pipe having a screw conveyor therein, a portion of the black being discharged through an opening placed in the side of the pipe within the mill, and the rest of the black being discharged at the end of the screw conveyor.

It is an important object of this invention to provide improved feeding mechanism of the general character shown by the aforesaid Larson and King application, wherein the flocculent black can be discharged from three or more openings in a single trough or a pipe, and wherein at least one of the openings is located above the center line of the screw conveyor, thereby improving the feeding characteristics of the system.

It is a further object to provide improved mechanism for feeding and distributing granular material.

It is a further object to provide an improved process and apparatus for the pelleting of carbon black.

It is a still further object to provide such a process and apparatus at a low cost, and to permit greater efficiency in the pelleting operation, particularly in the feeding of the flocculent black.

Various other objects, advantages and features of the invention will become apparent from the following detailed description taken in conjunction with the accompanying drawings, in which.

Although I have referred hereinbefore to a process and apparatus for pelleting carbon black, it will be understood that the various types of feeding mechanism now to be described in detail in conjunction with the drawings have independent utility in other applications, particularly in the transportation of granular material.

Figure 1:
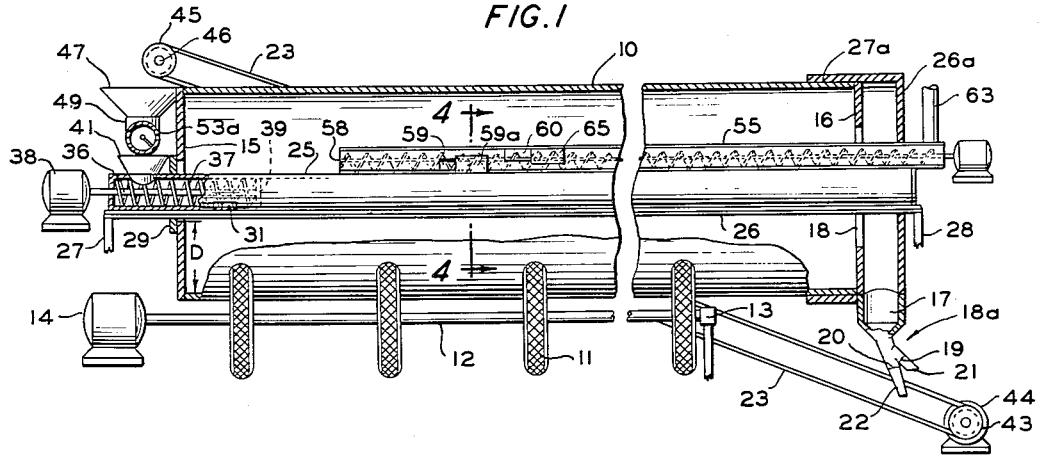
Figure 1 is a vertical sectional view, partially in elevation, of the feeding mechanism of this invention.
Figure 2:
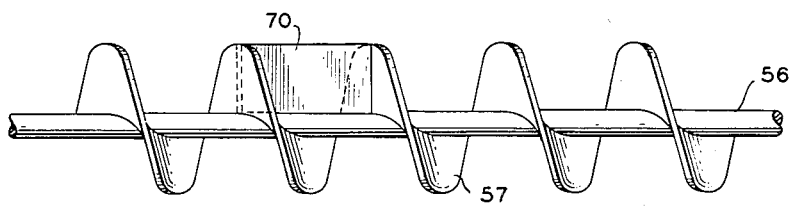
Figure 2 is a side elevational view of a screw conveyor constructed in accordance with the invention.
Figure 3:
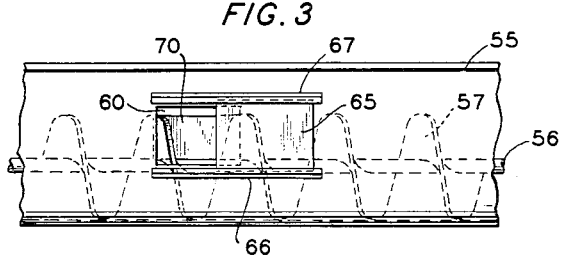
Figure 3 is a detail view of a portion of the feeding trough.

Referring now to the drawings in detail and particularly to Figures 1 and 2, a horizontally disposed generally cylindrical pellet mill 10 is supported by two sets of rubber tires, one of which is shown at 11, these tires being mounted upon a shaft 12 journaled in a support 13 and driven by a motor 14. When motor 14 is operated, the frictional engagement of the tires 11 with the pellet mill 10 causes the mill to rotate responsive to rotation of the tires. The mill 10 is provided with an annular plate 15 at its inlet end and with an annular plate 16 at its outlet end. When flocculent carbon black is introduced into the inlet end of the mill, carbon black pellets are formed by the "cascading" or rolling and tumbling action of the particles caused by rotation of the mill. The pellets so formed are discharged through the opening in end plate 16 into a chamber 17. It will be understood that the size of the opening 18 in plate 16 regulates the bed depth in the mill, the plate forming, in effect, a weir or dam over which the pellets are discharged into the chamber 17. From the chamber 17, the pellets flow to a proportioning device 18a which divides the withdrawn pellets into a recycle and a product portion, the distribution between which is controlled by dampers 19, 20 in outlet conduits 21 and 22, respectively. The product pellets flowing through conduit 22 are packaged in sacks or transported to tank cars for shipment while the recycle pellets from conduit 21 are discharged upon an endless belt 23 to be hereinafter described in more detail.

Extending axially through the mill 10 is an elongated stationary tube 25 supported upon a T-beam 26 which, in turn, is carried by suitable supports 27, 28. Stationary tube 25, in turn, supports a housing 26a defining the chamber 17 so that there is a bearing surface 27a between the stationary housing 26a and rotatable mill 10. The tube 25 can also carry stationary scrapers, not shown, to remove deposits of carbon black from the sides of the mill. It will be noted that, at the inlet end of the mill, an annular sealing member 29 is provided which is carried by the tube 25 and T-beam 26 and rubs against the end plate 15 of the mill. It will be noted that the opening in plate 15 need only be sufficiently large as to accommodate the tube 25 and T-beam 26 without rubbing or engagement between these parts. This greatly simplifies the sealing problem as the bed depth can be as great as the radial distance D between the outer surface of the mill and the outer edge of the opening in plate 15 without any tendency for the material within the mill to flow through this opening, which tendency would greatly increase the sealing problem. Furthermore, if a plurality of conveyors were utilized, it would be necessary to increase the size of the opening in plate 15 to accommodate the extra tubes or conduits. This, in turn, would decrease the distance D and, hence, the allowable bed depth permitted without involving a serious sealing problem at the inlet end of the mill.

Tube 25 has a discharge opening 31 formed in the bottom thereof, and extending upwardly from both sides of the T-beam 26. In a preferred embodiment of the invention, where the mill 10 is 48 feet long, the opening 31 is positioned 3 feet, 3 inches from the inlet end of the mill, and it is 8 inches long and extends 3 inches upwardly from the T-beam 26 on each side thereof. An axial shaft 36 is suitably journaled within the tube 25, this shaft carrying a helical metal plate 37 forming a screw conveyor. It will be understood that the word "tube," as used herein, comprehends a trough or other suitable structure for guiding the material to be conveyed. The shaft 36 is driven by a motor 38 and it is provided with a disk 39 which is downstream from the opening 31, this disk being closely spaced to the walls of the tube so as to prevent passage of any material beyond the opening 31.

Recycle pellets from the outlet end of the mill are introduced into a hopper 41 cooperating with a suitable feed opening in tube 25 in the manner now to be described. As previously stated, pellets from the outlet end of the mill pass through chamber 17 and proportioning device 18 to the endless belt 23. This belt is carried between a pulley 43 driven by a motor 44 and a pulley 45 suitably journaled at 47 upon a support, not shown. The belt is inclined and is located at the side of the pellet mill, the direction of belt rotation being such that the recycle pellets falling upon the belt are carried upwardly thereby from the outlet end to the inlet end of the mill and discharged into a hopper 47 which communicates with a feed opening 48 in a tube 49. A shaft 50a carrying a screw conveyor 51a and driven by a motor 52a conveys the recycle pellets laterally from the feed opening 48 to a discharge opening 53a communicating with the hopper 41 of the tube 25.

Figure 4:
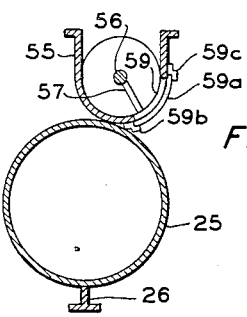
Figure 4 is a sectional view taken along the lines 4—4 of Figure 1.
Figure 5:
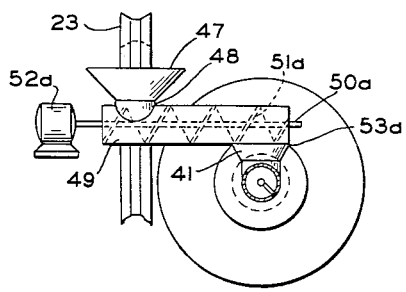
Figure 5 is a detail view of mechanism for feeding recycle pellets to the mill.

In accordance with the invention, flocculent black is fed to the mill through a tube or trough 55 which extends through a suitable opening formed in end plate 26a and is secured to the tube 25, the trough 55 being offset from the tube 25 as indicated in Figure 4. Suitably journaled within the trough 55 is a shaft 56 carrying a helical screw conveyor blade 57. Trough 55 has an open end 58 and a pair of spaced discharge openings 59 and 60. Flocculent black is introduced into the trough in any suitable manner, as from a pipe 63.

In the particular embodiment of the invention previously referred to, the end 58 of the trough is 7 feet, 3 inches from the inlet end of the mill, opening 59 is 3 feet, 6 inches from the end 58 of the trough, and opening 60 is 2 feet from opening 59. The openings 59 and 60 are each 12 inches in length and 10 inches in width. It will be noted that opening 59 is in the side of the trough at the lower portion thereof. In particular, the lower edge of opening 59 is at the intersection of the trough 55 and the tube 25. Opening 60 is located in the side of the trough at the upper portion thereof, and the lower edge of this opening is at the same level horizontally as the shaft 56. Opening 60 is further provided with a cover 65 which is slidable along guides 66 and 67 so that the length of the opening can be varied as desired. Alternatively, the plate 65 can slide vertically, the guides in this case being arranged at opposite ends of the opening.

Conveyor 57 is provided, adjacent the opening 60, with a vane or scoop 70. This vane is formed from a flat metal plate and extends radially from shaft 56 to the edge of the conveyor, the vane, accordingly, extending longitudinally about one flight of the conveyor. If desired, the blade can be somewhat curved so as to encompass more or less than one conveyor flight, or otherwise suitably formed to provide a scoop which lifts some of the flocculent black from the bottom of the trough and discharges it through the opening 60. Generally, a similar scoop, not shown, is provided in connection with the opening 59, although this is not essential in carrying out the invention, and opening 59 is provided with a cover plate 59a slidable on guides 59b and 59c.

In operation, rotation of the mill is initiated by operation of motor 14, flocculent black is fed to the mill through conduit 63, and recycle pellets, whether formed in the process or delivered from other sources during start-up, are introduced through hopper 41 to conveyor 37. It will be understood that, in pelleting some types of flocculent black, no recycle material is utilized, in which case the recycle mechanism can be eliminated. It is also within the scope of the invention to introduce the recycle pellets into the feed end of the mill by any suitable type of feeding mechanism, such as a pipe extending from hopper 41 to the inlet end of the mill, although the described type of recycle mechanism has been found to give superior results in commercial operation.

The flocculent black is moved longitudinally through trough 55 by conveyor 57, and a portion of the flocculent black is scooped up from the bottom of the trough by vane 70 and discharged through the opening 60. The amount discharged can be varied, as desired, by opening or closing the cover 65. Generally, about 45 to 50 per cent of the black is discharged through this opening. The remainder of the black is carried along through trough 55, and a further portion thereof is discharged through the opening 59. When opening 59 is located in the side of the trough, it is not necessary in many commercial operations to provide a scoop in connection with the opening, nor is it necessary to provide an adjustable cover therefor. However, if it is desired to feed a relatively large amount of material through openings 59 a scoop can be provided in connection therewith and, if necessary, an adjustable cover can be provided for this opening to regulate the quantity of flocculent black discharged therethrough. Generally about 45 to 50 per cent of the total amount of feed is introduced into the mill through opening 59. The remainder of the black, i. e., the portion which is not discharged through openings 59 and 60, amounting generally to from 0 to 10 per cent, is carried by the conveyor to the end 58 thereof and discharged therefrom into the pellet mill.

It will be noted, therefore, that the flocculent black, distributed to the mill at three longitudinally spaced zones near the feed end of the mill, the quantity of black discharged through the openings being regulated by the size thereof and by the position of the cover 65 and, if used, the corresponding cover 59a on opening 59. The flocculent black thus discharged into the mill is formed into pellets due to the cascading and tumbling action of the pellet bed produced by mill rotation. As a result, the bulk density of the flocculent carbon black is increased to as much as 20 to 30 pounds per cubic foot or higher so that it can be readily packaged or transported in hopper cars. In some operations, the covers 59a, 65 are so adjusted that about one-third of the black is discharged through each of the openings 59, 60 and the remaining one-third is discharged through the end 58 of trough 55.

It is a feature of the invention that the construction of the feeding tube and its discharge openings, is such as to minimize the formation of scale and the bridging of the openings by agglomerated carbon black. Even though a certain amount of scale builds up upon the vane 70, it does not interfere with the scooping action of this vane in lifting flocculent black from the bottom of the trough to the discharge opening, and the amount discharged can be very accurately regulated by adjustment of the sliding cover 65. It is an additional advantage of the vane and opening that the amount of black fed through the opening bears approximately the same proportion to the total black feed whether the trough 55 is relatively full or relatively empty for, in either case, the black is scooped up and carried upwardly to the opening, and the portion not passing through the opening spills over the shaft and returns to the bottom of the trough for discharge at opening 59 or at the end 58 of the trough.

The positioning of opening 60 above the level of the conveyor shaft 56 permits a relatively large opening to be used to distribute a small amount of carbon black. If such a large opening were placed at the bottom of the trough, an excessive portion of the black would be discharged therethrough whereas, in the position shown, only that portion is discharged through the opening which is lifted above the level of the shaft 56 by the vane 70. The relatively large size of the opening is very advantageous in that it greatly decreases the tendency for the opening to become plugged with agglomerated carbon black or scale with resulting reduction or variation in the amount of black fed therethrough.

In one commercial installation previously operated with three separate screw conveyors feeding the flocculent black to different zones within the mill, the substitution of the feeding system of this invention permitted an increase in feed rate and, hence, in mill capacity of 3500 pounds per day with a 42 foot mill, an increase in feed rate of 30 per cent with the same feed density. The feeding system in this commercial operation is also found to accurately proportion the amount of black discharged into the mill at the respective discharge openings.

While the invention has been described in connection with a present, preferred embodiment thereof, it is to be understood that this description is illustrative only and is not intended to limit the invention.

I claim:

1. Feeding mechanism comprising, in combination, an elongated horizontally-disposed trough or tube, a shaft extending through said tube, a screw conveyor carried by said shaft, the spirals of said screw conveyor advancing in the same direction throughout its length, means for feeding granular material to said screw conveyor, a discharge opening in said tube, and plate means secured to said conveyor adjacent said opening, said plate means being constructed and arranged to define a scoop, whereby granular material fed through said conveyor is picked up by said scoop and discharged through said opening.

2. Feeding mechanism comprising, in combination, an elongated horizontally-disposed tube or trough, a pair of longitudinally-spaced discharge openings in said tube, a screw conveyor mounted within said tube including a shaft and a helical sheet of metal surrounding and secured to said shaft, means for feeding granular material to said screw conveyor, one of said openings being disposed above the level of said shaft and having a length approximately equal to one flight of said conveyor, metal plate means secured to said helical sheet of metal adjacent said one opening, said plate means defining a scoop, whereby a portion of said granular material from the bottom of the tube is lifted upwardly by said scoop and discharged through said one opening, and another portion of said granular material is discharged through the other opening.

3. Feeding mechanism comprising, in combination, an elongated horizontally disposed tube or trough, a pair of longitudinally-spaced discharge openings in said tube, a screw conveyor mounted within said tube including a shaft and a helical sheet of metal surrounding and secured to said shaft, means for feeding granular material to said screw conveyor, one of said openings being disposed above the level of said shaft and having a length approximately equal to one flight of said conveyor, metal plate means secured to said helical sheet of metal adjacent said one opening, said plate means defining a scoop, whereby a portion of said granular metal from the bottom of the tube is lifted upwardly by said scoop and discharged through said one opening, and another portion of said granular material is discharged through the other opening, guide means secured to said tube adjacent said one discharge opening, and a cover plate slidable along said guide means to regulate the size of said discharge opening.

4. Feeding mechanism comprising, in combination, an elongated tube or trough, a screw conveyor extending through said tube and disposed horizontally, means for feeding granular material to said screw conveyor, a plurality of discharge openings in said tube, one of said openings being formed in the upper portion of said tube, means cooperating with said conveyor to define a scoop constructed and arranged to lift granular material from the bottom of said tube and discharge it through said opening, guide means associated with said opening, and a cover plate slidable along said guide means to regulate the size of said opening.

5. In apparatus for pelleting carbon black, in combination, a cylindrical mill, means for rotating said mill, means for feeding pellets of carbon black into said mill adjacent one end thereof, a horizontal trough extending from a point outside said mill through the other end thereof and a substantial distance thereinto, a screw conveyor mounted in said trough, means for feeding flocculent carbon black to said screw conveyor, and a discharge opening formed in said trough adjacent the end of the mill at which the pellets are introduced, said discharge opening being disposed above the level of the center of said screw conveyor, and means cooperating with said screw conveyor to form a scoop for lifting flocculent carbon black from the bottom of said trough and discharging it through said opening.

6. In apparatus for pelleting carbon black, in combination, a cylindrical mill, means for rotating said mill, means for feeding pellets of carbon black into said mill adjacent one end thereof, a horizontal trough leading into said mill from the other end thereof and extending substantially the entire length thereof, a screw conveyor mounted in said trough, means for feeding flocculent carbon black to said screw conveyor, and a discharge opening formed in said trough adjacent said one end of the mill, said discharge opening being disposed above the level of the center of said screw conveyor, means cooperating with said screw conveyor to form a scoop for lifting flocculent carbon black from the bottom of said trough and discharging it through said opening, guide means associated with said opening, and a cover plate slidable along said guide means to regulate the size of said opening.

7. In apparatus for pelleting carbon black, in combination, a generally cylindrical pellet mill disposed in a horizontal position, a non-rotatable tube extending axially through said pellet mill, means for sealing the region between said tube and the ends of said mill, said tube having a feed opening outside said mill and a discharge opening inside said mill, a screw conveyor in said tube for conveying material from said feed opening through one end of the mill to said discharge opening, means for feeding pellets of carbon black to said feed opening, a trough extending into said mill from the other end thereof and secured to said tube, a screw conveyor in said trough, means for feeding flocculent black to said last-mentioned screw conveyor, and means for discharging flocculent black into the mill from said last-mentioned screw conveyor, said latter means comprising a discharge opening positioned at an intermediate point in said trough and above the axis of said screw conveyor.

8. In apparatus for pelleting carbon black, in combination, a generally cylindrical pellet mill disposed in a horizontal position, a non-rotatable tube extending axially through said pellet mill, means for sealing the region between said tube and the ends of said mill, said tube having a feed opening outside said mill and a discharge opening inside said mill, a screw conveyor in said tube for conveying material from said feed opening through one end of the mill to said discharge opening, means for feeding pellets of carbon black to said feed opening, a substantial distance extending through into said mill from the other end thereof and terminating in an open end near the point of introduction of said pellets, a screw conveyor in said trough, means for feeding flocculent black to said last-mentioned screw conveyor, a discharge opening in the upper part of said trough and spaced from said open end thereof, and a metal plate secured to said last-mentioned screw conveyor and defining a scoop therewith to lift carbon black from the bottom of said trough and discharge it through said opening into the mill.

9. In apparatus for pelleting carbon black, in combination, a generally cylindrical pellet mill disposed in a horizontal position, a non-rotatable tube extending axially through said pellet mill, means for sealing the region between said tube and the ends of said mill, said tube having a feed opening outside said mill and a discharge opening inside said mill, a screw conveyor in said tube for conveying material from said feed opening through one end of the mill to said discharge opening, means for feeding pellets of carbon black to said feed opening, a trough leading into said mill, said trough extending substantially the entire length of said mill, and secured to said tube, a screw conveyor in said trough, means for feeding flocculent black to said last-mentioned screw conveyor, said trough terminating in an open end nearer the point of introduction of said pellets, a discharge opening in the upper part of said trough and spaced from the end thereof, a metal plate secured to said last-mentioned screw conveyor and defining a scoop therewith to lift carbon black from the bottom of said trough and discharge it through said opening into the mill, guide means associated with said opening, and a cover plate slidable along said guide means to regulate the size of said opening and thereby the amount of flocculent carbon black discharged therethrough.

10. In apparatus for pelleting carbon black, in combination, a generally cylindrical pellet mill disposed in a horizontal position, a non-rotatable tube extending axially through said pellet mill, means for sealing the region between said tube and said mill, said tube having a feed opening outside said mill and a discharge opening inside said mill adjacent one end thereof, a screw conveyor in said tube for conveying material from said feed opening to said discharge opening, means for feeding pellets of carbon black to said feed opening, a trough extending through the other end of said mill and secured to said tube, said trough terminating in an open end within said mill at a point intermediate said other end of the mill and the discharge opening of said tube, a screw conveyor in said trough, means for feeding flocculent black to said screw conveyor in the trough, a first discharge opening in the upper part of said trough and spaced from the end thereof, and a second discharge opening intermediate said first discharge opening and said open end of the trough, a metal plate secured to said screw conveyor and defining a scoop therewith to lift carbon black from the bottom of said trough and discharge it through said first opening into the mill, guide means associated with both openings, and a pair of cover plates slidable upon the respective guide means to regulate the size of said openings.

11. In apparatus for pelleting carbon black, in combination, a cylindrical mill, means for rotating said mill, means for feeding pellets of carbon black into said mill adjacent one end thereof, a horizontal trough extending from a point outside said mill through the other end thereof and a substantial distance thereinto, a screw conveyor mounted in said trough, means for feeding flocculent carbon black to said screw conveyor, a discharge opening formed in said trough adjacent said one end of the mill, and means for rotating said screw conveyor to discharge flocculent carbon black from said trough through said opening onto a bed of pellets in said mill.

12. In apparatus for pelleting carbon black, in combination, a generally cylindrical pellet mill disposed in a horizontal position, a non-rotatable tube extending axially through said pellet mill, means for sealing the region between said tube and the ends of said mill, said tube having a feed opening outside said mill and a discharge opening inside said mill, a screw conveyor in said tube for conveying material from said feed opening through one end of the mill to said discharge opening, means for feeding pellets of carbon black to said feed opening, a trough extending into said mill from the other end thereof and secured to said tube, a screw conveyor in said trough, means for feeding flocculent black to said last-mentioned screw conveyor, and means for discharging flocculent black into the mill from said last-mentioned screw conveyor.

13. In apparatus for pelleting carbon black, in combination, a generally cylindrical pellet mill disposed in a horizontal position, a nonrotatable tube extending axially through said pellet mill, means for sealing the region between said tube and the ends of said mill, said tube having a feed opening outside said mill and a discharge opening inside said mill, a screw conveyor in said tube for conveying material from said feed opening through one end of the mill to said discharge opening, means for feeding pellets of carbon black to said feed opening, a trough extending into said mill from the other end thereof and secured to said tube, a screw conveyor in said trough, means for feeding flocculent black to said last-mentioned screw conveyor, and means for discharging flocculent black into the mill from said last-mentioned screw conveyor at a plurality of longitudinally-spaced regions adjacent said one end of the mill.

References Cited in the file of this patent

UNITED STATES PATENTS

| Re. 6,672 | Regan | Oct. 5, 1875 |
| 302,501 | Kruse | July 22, 1884 |
| 311,052 | Anderson | Jan. 20, 1885 |
| 1,312,858 | Lower | Aug. 12, 1919 |
| 1,703,465 | Woodhead | Feb. 26, 1929 |
| 2,504,787 | Bailey | Apr. 18, 1950 |
| 2,638,625 | Studebaker et al. | May 19, 1953 |
| 2,653,701 | Heth | Sept. 29, 1953 |